US010063975B2

(12) United States Patent
Jeon et al.

(10) Patent No.: US 10,063,975 B2
(45) Date of Patent: Aug. 28, 2018

(54) MOBILE TERMINAL

(71) Applicant: LG ELECTRONICS INC., Seoul (KR)

(72) Inventors: Taehwan Jeon, Seoul (KR); Donghan Kang, Seoul (KR); Janghwan Shim, Seoul (KR); Byungkil Choi, Seoul (KR); Joontae Kim, Seoul (KR); Jungmin Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/613,647

(22) Filed: Jun. 5, 2017

(65) Prior Publication Data

US 2018/0027329 A1 Jan. 25, 2018

(30) Foreign Application Priority Data

Jul. 22, 2016 (KR) .................. 10-2016-0093684

(51) Int. Cl.
  *H04R 5/02* (2006.01)
  *H04R 5/04* (2006.01)
  *H04R 1/24* (2006.01)
  *H04M 1/02* (2006.01)

(52) U.S. Cl.
  CPC .............. *H04R 5/02* (2013.01); *H04R 1/24* (2013.01); *H04R 5/04* (2013.01); *H04M 1/0256* (2013.01); *H04R 2420/07* (2013.01); *H04R 2420/09* (2013.01); *H04R 2499/11* (2013.01)

(58) Field of Classification Search
  CPC ... H04R 5/02; H04R 1/24; H04R 5/04; H04R 2420/07; H04R 2420/09; H04R 2499/11; H04M 1/0256

USPC ..... 381/59, 75, 77, 78, 81, 85, 109, 11, 119, 381/120, 300, 307, 311; 455/11.1, 41.1, 455/41.2, 41.3, 550.1, 572, 575.1, 575.4
See application file for complete search history.

(56) References Cited

U.S. PATENT DOCUMENTS

| 4,829,500 | A | * | 5/1989 | Saunders | ................. H04R 5/02 360/137 |
| 7,653,344 | B1 | * | 1/2010 | Feldman | ................. H04H 20/61 455/3.06 |
| 2008/0166002 | A1 | * | 7/2008 | Amsel | .................... H04R 1/025 381/370 |
| 2011/0095975 | A1 | * | 4/2011 | Hwang | .................. G06F 1/1626 345/156 |

(Continued)

*Primary Examiner* — Vivian Chin
*Assistant Examiner* — Friedrich W Fahnert
(74) *Attorney, Agent, or Firm* — Birch, Stewart, Kolasch & Birch, LLP

(57) ABSTRACT

A mobile terminal including a first body; a first audio output unit provided in the first body and configured to output sound; an audio conversion unit provided in the first body and configured to convert a sound source signal into an audio signal; a second body detachably coupled to the first body; and a second audio output unit provided in the second body and configured to output sound, wherein the audio conversion unit converts the sound source signal into a default audio signal and transmits the converted signal to the first audio output unit, in a state where the second body is detached from the first body, and the audio conversion unit converts the sound source signal into a first audio signal and transmits the converted first audio signal to the first audio output unit, when the second body is coupled to the first body.

18 Claims, 23 Drawing Sheets

(56) References Cited

U.S. PATENT DOCUMENTS

2013/0311176 A1\* 11/2013 Brown ................ H04R 1/1091
                                                    704/233
2016/0323673 A1\* 11/2016 Peng ...................... H04R 9/022
2017/0054833 A1\* 2/2017 Wong ...................... G06F 1/203

\* cited by examiner

MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2016-0093684, filed on Jul. 22, 2016, the contents of which are hereby incorporated by reference herein in their entirety.

BACKGROUND OF THE DISCLOSURE

Field of the Disclosure

Embodiments of the present disclosure relate to a speaker-module-detachable type mobile terminal.

Background of the Disclosure

In a module-detachable type mobile terminal, a module is employed to enhance multimedia functions of a mobile terminal. Such a module is categorized into diverse types from a camera-function assistance type to audio-output assistance type. Considering an audio-output assistance type out of such diverse type modules, the audio-output assistance type module replaces a speaker unit which has been coupled to an existing main body in case of being coupled to the main body.

Accordingly, the speaker unit provided in the existing main body and the audio-output assistance module are not used simultaneously. When more than two speaker units are provided, the audio-output spaces for the speaker units are spaced apart for dynamic stereo sound. Separated stereo sound is audible through tuning of the speaker units.

Sound is realized only using the speaker unit provided in the audio-output assistance module, so that it is impossible to use as many speaker units in maximizing the audio-output effect. Even if the audio-output assistance module is mounted to the main body having the existing speaker unit coupled thereto, the existing speaker unit is deactivated not to output sound or only outputs mono-sound which could be output from the existing mono speaker unit. Therefore, a user fails to listen to full rich sound.

SUMMARY OF THE INVENTION

An object of the present disclosure is to provide a mobile terminal for solving the disadvantage of sound output degrading as mentioned above which is caused when the sound output of a speaker unit provided in the main body is equal to the existing sound even if an audio-output assistance module is mounted to a main body.

Embodiments of the present disclosure may provide a mobile terminal comprising: a first body; a first audio output unit provided in the first body and configured to output sound; an audio conversion unit provided in the first body and configured to convert a sound source signal into an audio signal; a second body detachably coupled to the first body; and a second audio output unit provided in the second body and configured to output sound, wherein the audio conversion unit converts the sound source signal into a default audio signal and transmits the converted signal to the first audio output unit, when the second body is detached from the first body, and the audio conversion unit converts the sound source signal into a first audio signal and transmits the converted first audio signal to the first audio output unit, when the second body is coupled to the first body.

In accordance with at least one of the embodiments of the present disclosure, the mobile terminal has the following advantages. First, the sound output effect can be fully rich according to the coupling of the second body to the first body advantageously. It is also possible to easily recognize whether the second body is coupled to the first body.

Further, the first body and the second body can be coupled to each other by using a port or terminal included in the mobile terminal. In addition, the audio output unit of the first body is connected with an external device and can output sound, without being covered by the second body.

Also, heat generated when the second body is coupled to the first body can be minimized effectively. In addition, the second body can be conveniently coupled to the first body.

Effects obtainable from the present disclosure may be non-limited by the above mentioned effect. And, other unmentioned effects can be clearly understood from the following description by those having ordinary skilled in the technical field to which the present disclosure pertains. It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features and advantages of the present disclosure will become more apparent upon consideration of the following description of preferred embodiments, taken in conduction with the accompanying drawing figures. In the drawings.

DETAILED DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
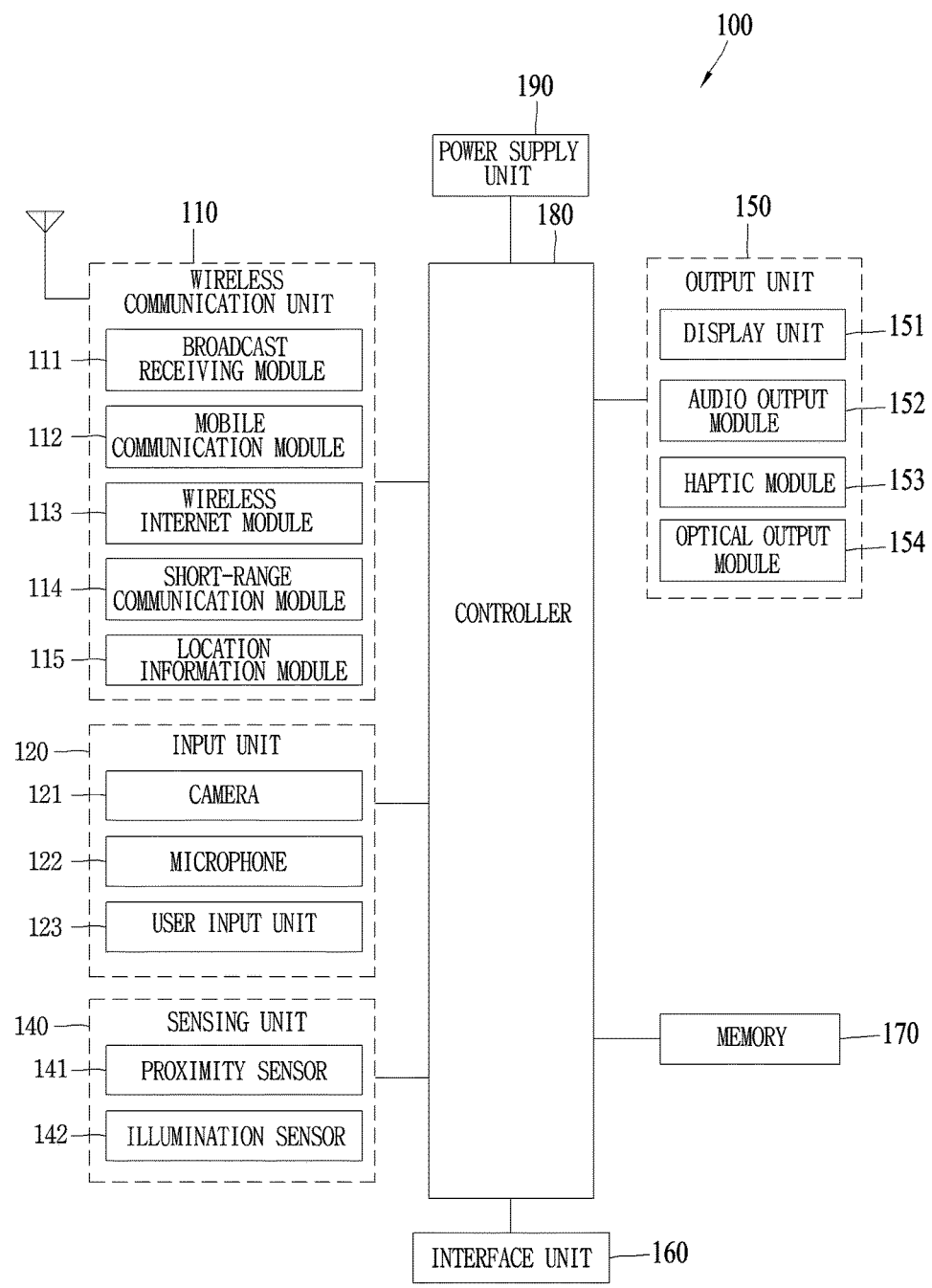
FIG. 1A is a block diagram of a mobile terminal associated with the present disclosure.
Figure 1B:
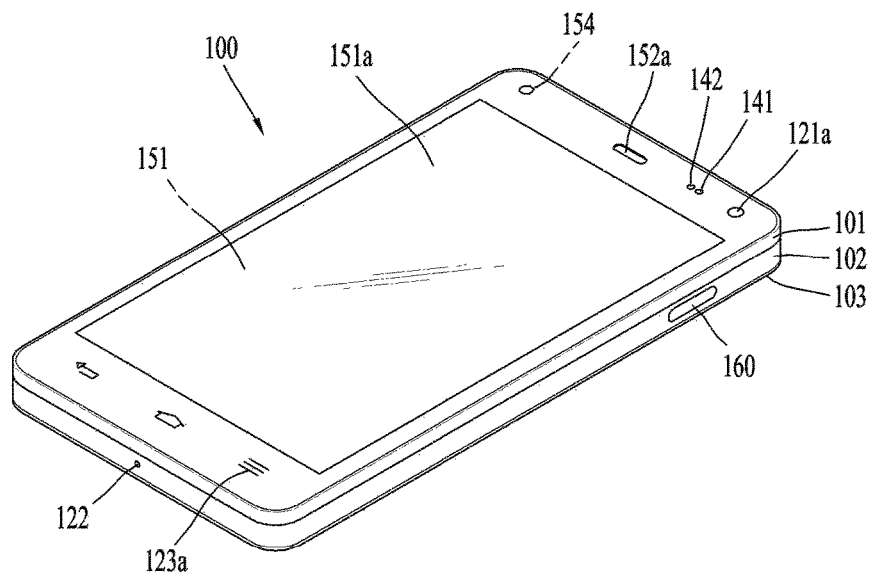
FIGS. 1B and 1C are conceptual views of one example of the mobile terminal, viewed from different directions.
Figure 1C:
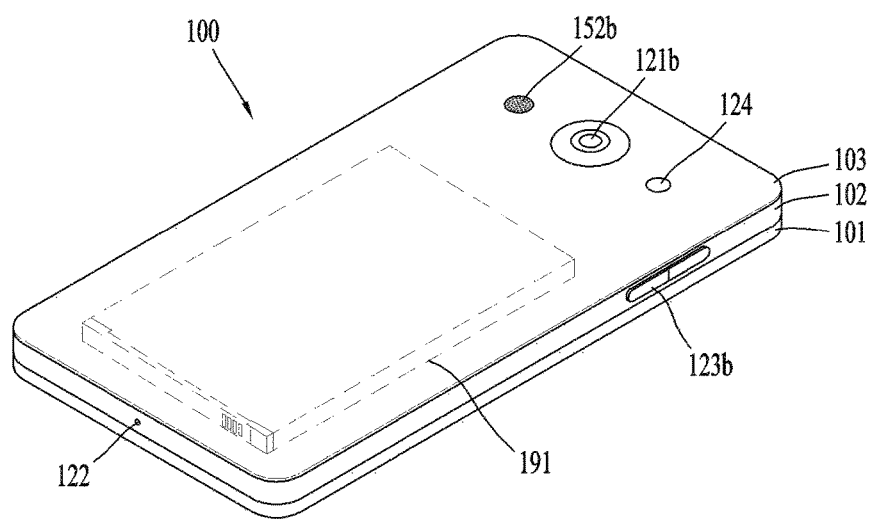

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components in The FIG. 1A is not a requirement, and that greater or fewer components may alternatively be implemented.

Referring now to FIG. 1A, the mobile terminal 100 is shown having wireless communication unit 110 configured with several commonly implemented components. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and the 'module', 'unit' and part' can be used together or interchangeably.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
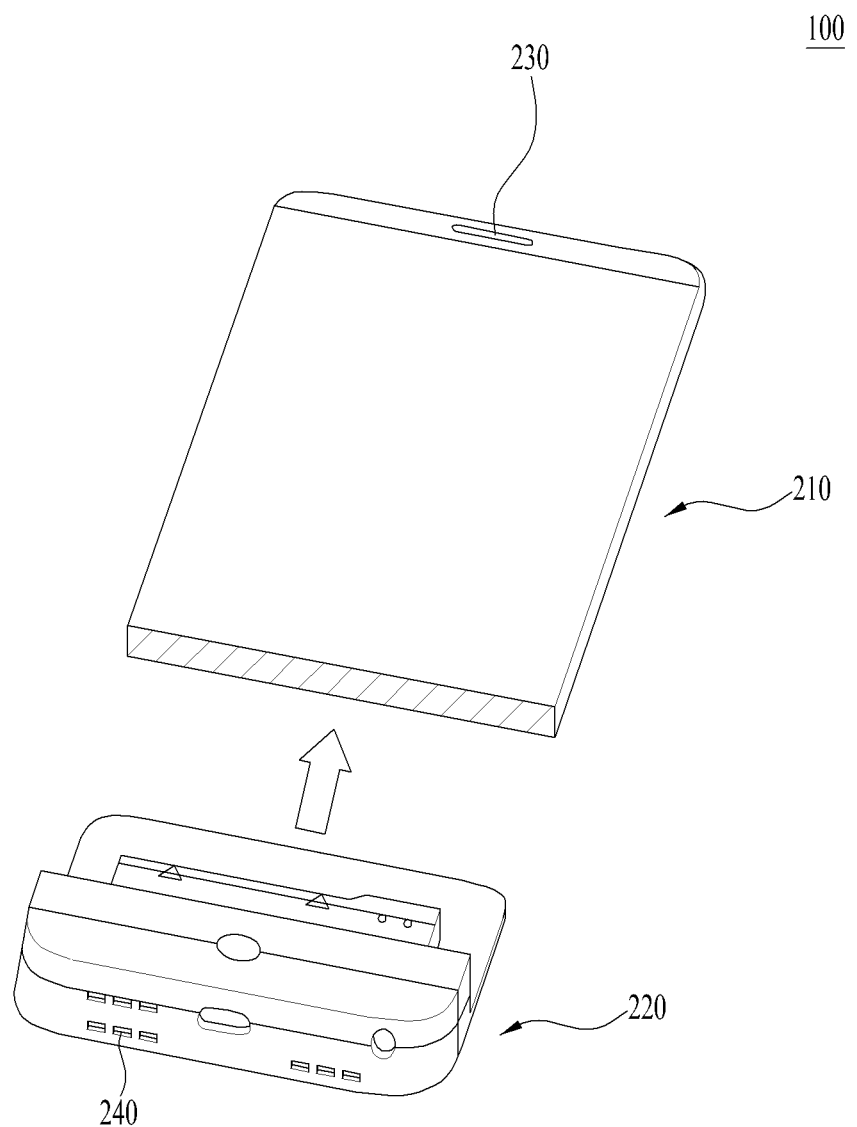
FIG. 2 is a sectional diagram illustrating one type of the mobile terminal associated with the present disclosure.

FIG. 2 is a sectional diagram illustrating one type of a mobile terminal 100 associated with the present disclosure. As mentioned above, the mobile terminal 100 may be provided as a speaker-module-detachable type. The speaker module corresponds to a component mounted to a specific main body and configured to add or enhance a function related sound output.

The speaker module may be a replaceable type. For convenience sake, the main body is defined as a first body 210 and a detachable speaker module is defined as a second body 220. The technical features described with reference to FIGS. 1A to 1C are also applicable to the illustrating embodiment, except that the first body 210 and the second body 220 are mountable and detachable. In addition, the following embodiments a first audio output unit 230 is provided in the first body 210 and a second audio output unit 240 in the second body 220.

Figure 3:
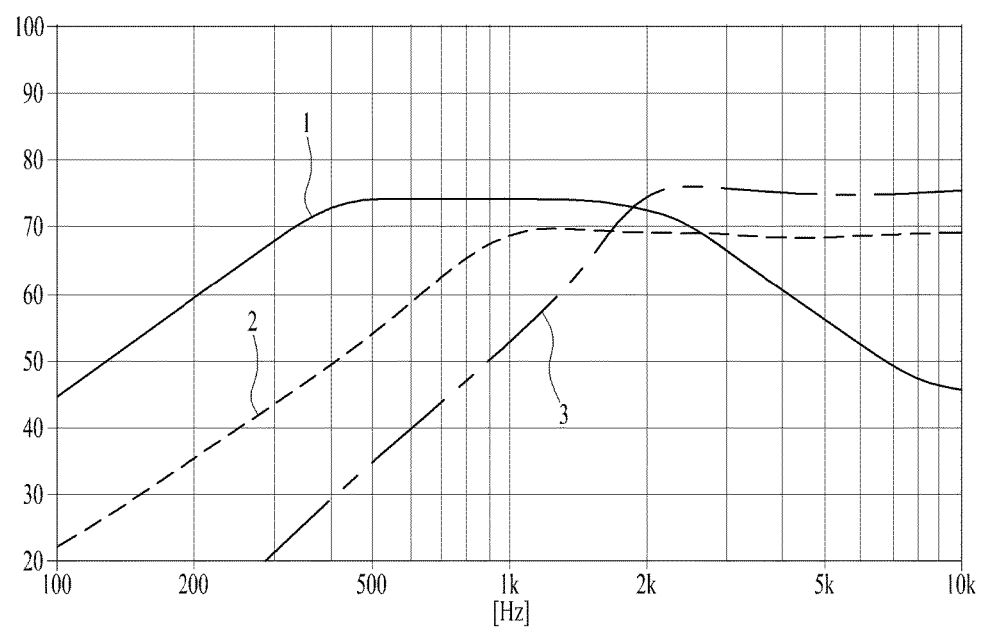
FIG. 3 is a graph of frequency-decibel which is associated with the present disclosure.

Next, FIG. 3 is a graph of frequency-decibel which is associated with the present disclosure. In the graph of FIG. 3, a horizontal axis shows a frequency domain which the speaker can output and a vertical axis shows the maximum value which can be output in the corresponding frequency domain.

Sound is output via the speaker and the frequency of the audio signal and the size of the decibel are then determined. As the value of the frequency becomes larger, the sound focused on high-pitched tones is audible. As it becomes smaller, the sound focused on low-pitched tones is audible. A first frequency graph curve (indicated as "1") means the sound focused on the low-pitched tones and a second frequency curve (indicated as "2") means normal sound. The third frequency curve (indicated as "3") means the sound focused on the high-pitched tones.

At this time, the normal sound refers to the sound when low-pitched, high-pitched or middle-pitched tones are not focused at all. In other words, the normal sound refers to the sound intended by a sound source before conversion. The sound source refers to the source data transmitted from an internal device or an external device for the first time. In other words, the sound source corresponds to the data before being processed or tuned.

Meanwhile, the high-pitch-focused means that the output in the high-pitched frequency domain becomes relatively increased. In contrast, the high-pitch-focused means that the output in the low-pitched frequency domain becomes relatively increased. In addition, 1 to 3 frequency graph curves corresponds to only overall tendency and not necessarily mean that the low-pitch, middle-pitch and high-pitch tones have the same value as shown in FIG. 2.

The tendency of the output sound can be determined based on the tendency of the sound course signal input to the speaker and the physical tendency of the speaker. The sound source signal corresponds to the initially input signal before being converted by the audio-conversion unit 211 (see FIG. 11).

However, the physical tendency is predetermined, apart from the tendency of the sound source signal. As examples, the speaker may be categorized into a woofer speaker, a squawker speaker and a tweeter speaker based on a specific register in an output enable frequency band.

In general, the woofer speaker functions to output a frequency band of 100 Hz~299 Hz and the squawker speaker functions to output a frequency band of 500 Hz~2.9 KHz. The tweeter speaker functions to output a frequency band of 3 KHz~6.9 KHz. Even when the tendency of the input audio signals is from a low frequency to a high frequency, the output enable frequency band is limited by the physical tendency of the speaker.

When one device includes one speaker unit, it is common that the speaker unit includes a squawker or tweeter speaker which can output a relatively wide frequency. An audio output unit having a physical property of a woofer speaker output unit may include different physical data from an audio unit having a conventional output or tweeter output. For example, a diaphragm may be thicker and larger so as to correspond to the low frequency.

In general, the tweeter speaker unit may output both the graph curve referenced to as "2" and the graph curve referenced to as "3" which are shown in FIG. 2. The woofer speaker unit may output only the graph curve referenced to as "1" shown in FIG. 2. However, the embodiments of the present disclosure are not limited thereto and the output enable frequency band can be determined based on the degree of the physical structure.

A compact-sized terminal such as the mobile terminal 100 has a spatial limitation for a speaker and a micro-speaker is provided in such a compact-sized terminal. The micro-speaker has the output tendency of the squawker or tweeter speaker. When including a plurality of speaker units, the device may include the woofer and the tweeter speaker unit and then have a high degree of freedom with respect to the output enable frequency band.

When one micro-speaker unit having the output tendency of the squawker or tweeter speaker is provided in the mobile terminal 100, the audio-conversion unit 211 converts the input sound source signal into a default audio signal without tuning to output the normal sound referenced to as "2" of FIG. 2, so that the user can be provided with the evenly distributed sound having a flat tendency. The audio-conversion unit 211 will be descried in detail with to FIG. 11.

Figure 4:
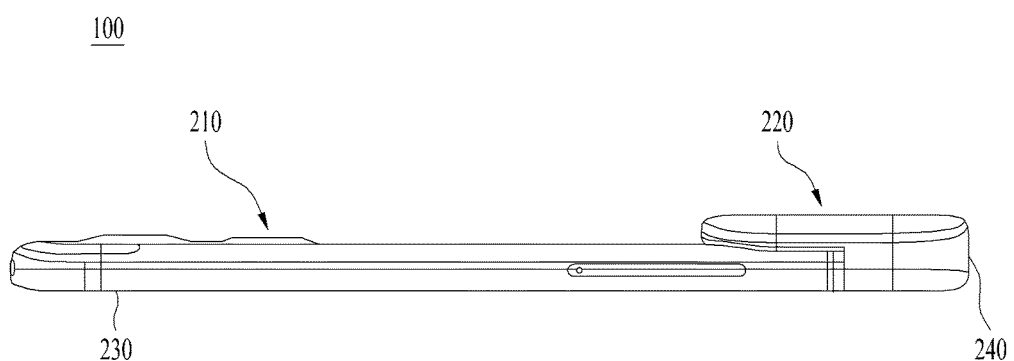
FIG. 4 is a diagram illustrating one embodiment of the mobile terminal associated with the present disclosure.
Figure 5:
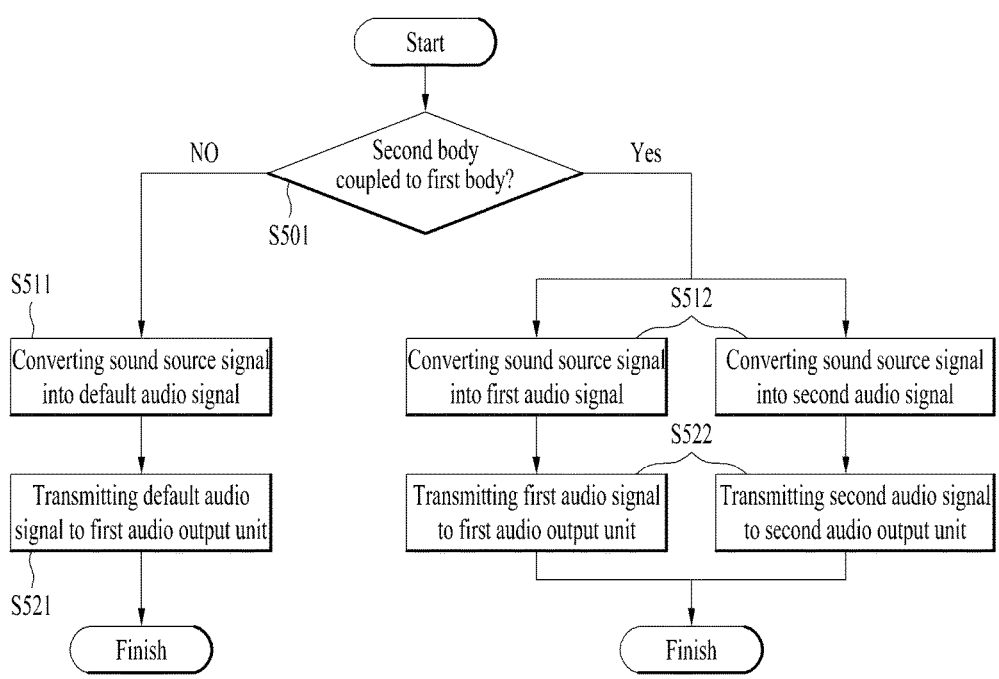
FIG. 5 is a schematic flow chart of conversion algorithm for an audio-conversion unit associated with the present disclosure.

FIG. 4 is a diagram illustrating one embodiment of the mobile terminal 100 associated with the present disclosure, and FIG. 5 is a schematic flow chart of conversion algorithm for the audio-conversion unit 211 associated with the present disclosure. The mobile terminal 100 which will be described hereinafter includes a first body 210 and a second body 220 and the first and second bodies 210 and 220 are detachable from each other, unless specifically noted.

Moreover, the first body 210 includes a first audio output unit 230 and the second body 220 includes a second audio output unit 240. Each of the first and second audio output units 230 and 240 may include one independent speaker unit. The audio conversion unit 211 for audio post processing may be provided in the first body 210. As occasion demands, the audio conversion unit 2111 may be provided in the second body 220 or the audio conversion units 211 may be provided in the first body 210 and the second body 220, respectively.

The audio post processing corresponds to a process for making the audio output unit be in a standby state to output sound by the electrical processing of the sound source. When only the first audio output unit 230 is provided in one first body 210 of the mobile terminal 100, in other words, the second body 220 is not coupled to the first body 210, the audio conversion unit 211 can convert a sound source signal into a default audio signal and then transmit the converted default audio signal to the first audio output unit 230 so as to enable it to output the flat normal audio of the graph curve referenced to as "2".

Specifically, the audio conversion unit 211 can convert the sound source signal into the default audio signal, without the tuning process for focusing a specific frequency band, and then transmit the converted default audio signal to the first audio output unit 230. When only the first body 210 including the first audio output unit 230 is provided (No in S501), the sound source signal is converted into the not-tuned default audio signal to output the normal output sound (S511). When the first body 210 having the first audio output unit 230 outputs sound together with the second body 220 having the second audio output unit 240 which is coupled to the first body 210 (Yes in S501), the high-pitched sound and the low-pitched sound can be output and a corresponding tuning process can be performed accordingly (S512).

The first audio output unit 230 and the second audio output unit 240 refer to the independent output units so that they may have physically independent sound output diaphragm or combination of a diaphragm and be configured to receive and output independent audio signals, respectively. In addition, they may share the same components and circuit in a signal conversion step before receiving the audio signal.

When the second body 220 is coupled to the first body 210, the first audio output unit 230 and the second audio output unit 240 function together as the speaker. When they function as the speaker together, the first audio output unit 230 and the second audio output unit 230 can output the high-pitched sound and the low-pitched sound, respectively, so as to allow the entire sound of the mobile terminal 100 to be fully rich.

The audio conversion unit 211 can convert a sound signal into a first audio signal having a focused specific frequency range and transmit the converted signal to the first audio output unit 230, and convert a sound signal into a second audio signal having another focused specific frequency range and transmit the converted signal to the second audio output unit 240 (S512 and S522).

The audio conversion unit 211 recognizes the coupling of the first body 210 to the second body 220 and performs the selective tuning and transmits the converted signal to the audio output unit. The audio conversion unit 211 recognizing the coupling of the second body 220 to the first body 210 may be configured to have all or some parts of the concept possessed by the controller 180 mentioned above.

In other words, the controller 180 can recognize the coupling between the second body 220 and the first body 210 and transmit a signal to the audio conversion unit 211 to control it to perform the audio post processing corresponding to the signal. The controller 180 of the first body 210 can recognize the coupling of the second body 220 based on a specific resistance of the second body 220.

Figure 6:
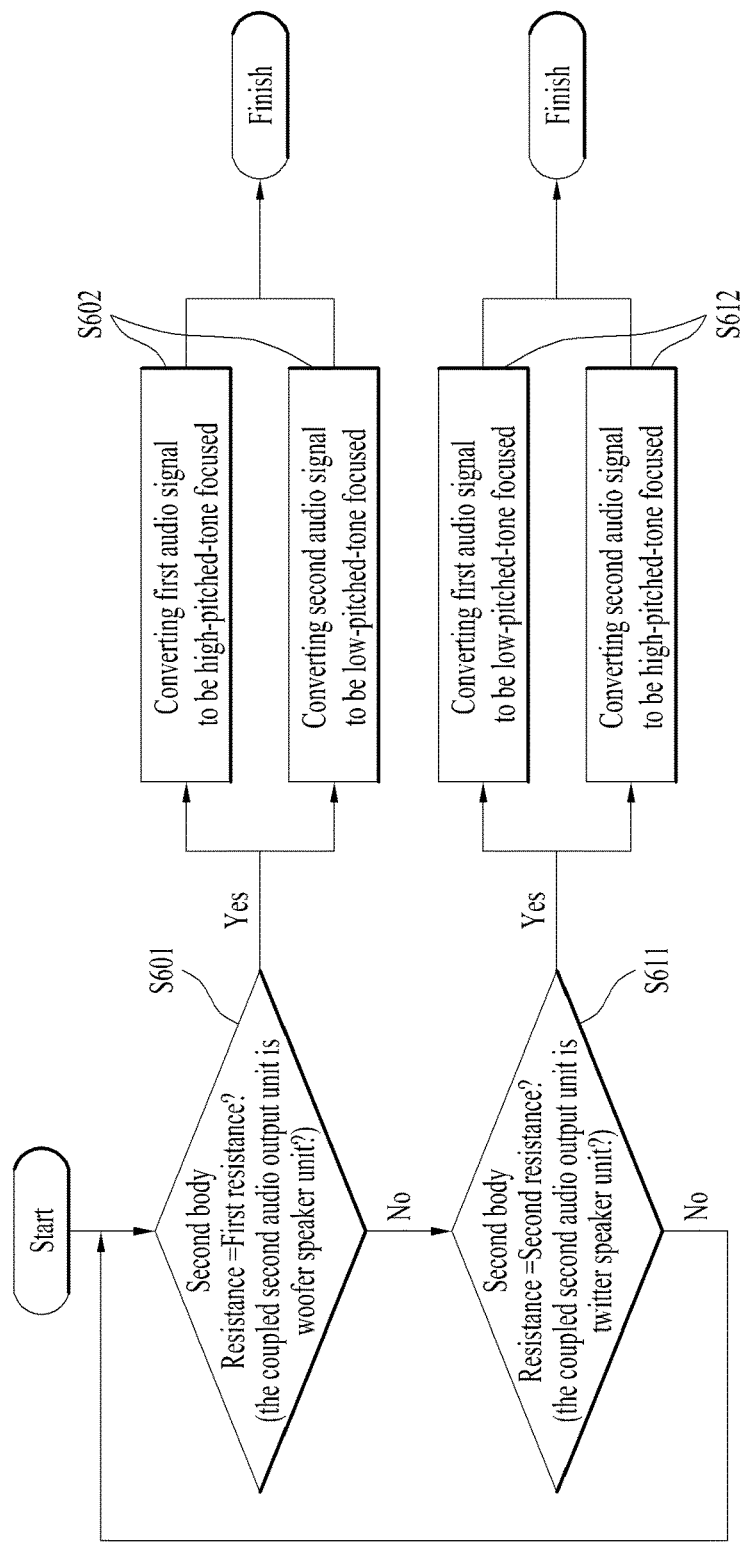
FIG. 6 is a diagram illustrating one embodiment of the conversion algorithm for the audio conversion unit associated with the present disclosure.

Next, FIG. 6 is a diagram illustrating one embodiment of the conversion algorithm for the audio conversion unit 211 associated with the present disclosure. The output tendency of the first audio signal transmitted to the first audio output unit 230 and the output tendency of the second audio signal transmitted to the second audio output unit 240 may be variable according to the physical tendency of the second audio output unit 240 provided in the second body 220.

When the coupled second audio output unit 240 has the physical property of the woofer speaker unit (S601), the audio conversion unit 211 converts the first audio signal into a high-pitched-tone focused signal and the second audio signal into a low-pitched-tone focused signal, so as to transmit the converted signals to the audio output units, respectively, (S602).

In contrast, when the coupled second audio output unit 240 has the physical property of the tweeter speaker unit (S611), the audio conversion unit 211 can convert the first audio signal into a low-pitched-tone focused signal and the second audio signal into a high-pitched-tone focused signal and then transmit the converted signals to the audio output units, respectively (S561). The audio conversion unit 211 can recognize whether the physical property of the coupled second audio output unit 240 is the woofer speaker unit or the tweeter speaker unit based on the resistances of the speaker units which are different from each other.

The audio conversion unit 211 can figure out the physical property of the coupled second audio output unit 240, considering each case, and convert and transmit the first and second audio signals into corresponding signals. For example, a coupling resistance of the second body 220 having the second audio output unit 240 corresponding to the woofer speaker unit may be set as a first resistance. In addition, a coupling resistance of the second body 220 having the second audio output unit 240 corresponding to the tweeter speaker unit may be set as a second resistance.

The audio conversion unit 211 converts the first audio signal to be high-pitched tone focused and the second audio signal to be low-pitched-tone focused (S602), when the recognized resistance is the first resistance (S601). In contrast, the audio conversion unit 211 converts the first audio signal to be low-pitched-tone focused and the second audio signal to be high-pitched-tone focused (S612), when the recognized resistance is the second resistance (S611). Specifically, the audio conversion unit 211 differentiates the focused frequency range of the first and second audio signals according to the resistance of the coupled second body 220.

Figure 7:
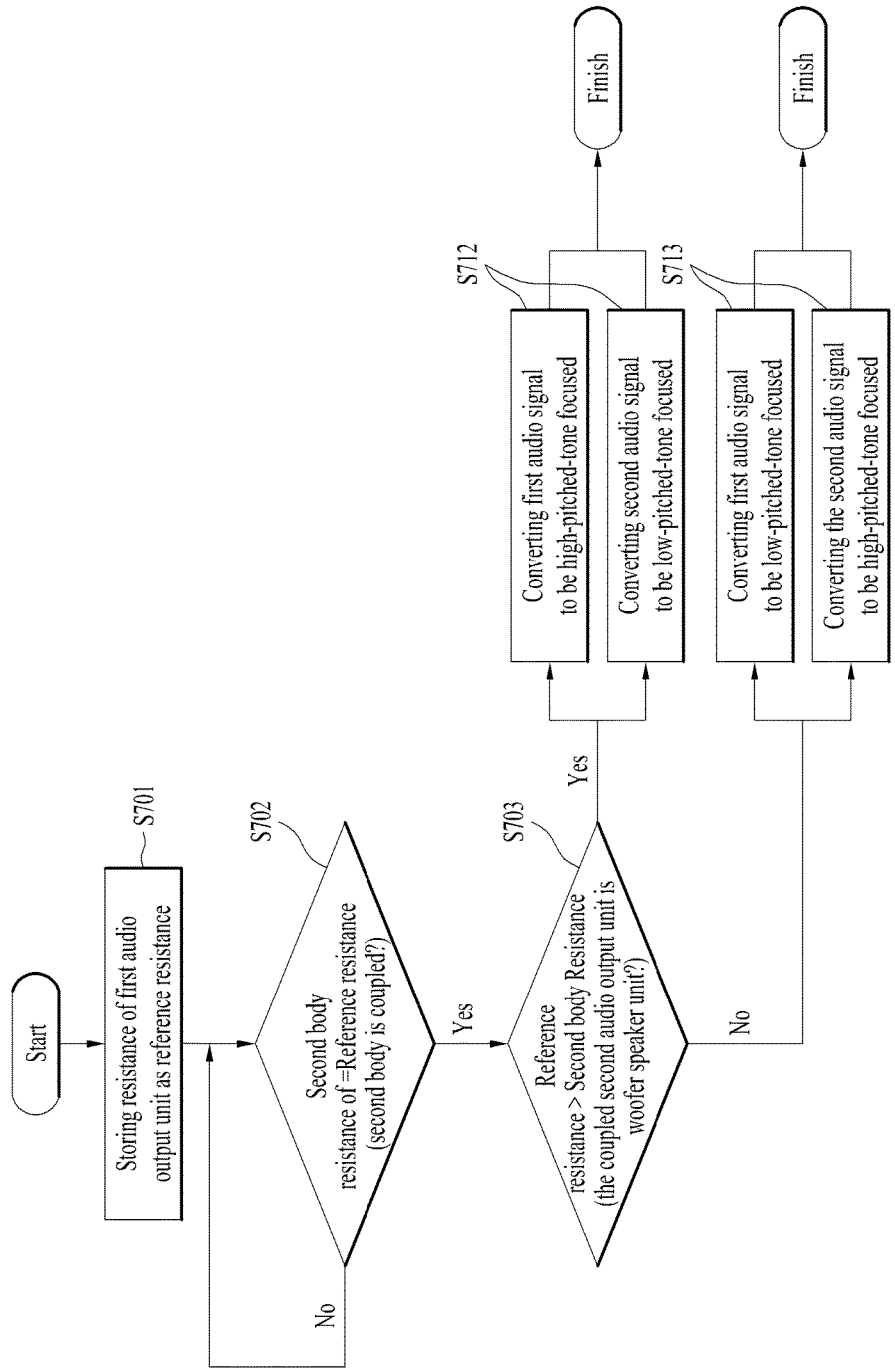
FIG. 7 is a diagram illustrating another embodiment of the conversion algorithm for the audio conversion unit associated with the present disclosure.

FIG. 7 is a diagram illustrating another embodiment of the conversion algorithm for the audio conversion unit 211 associated with the present disclosure. This illustrated embodiment discloses that the audio signal is converted, only considering the relatively physical properties of the first audio output unit 230 of the first body 210 and the second audio output unit 240 of the second body 220.

However, it may be necessary to consider a relative physical property between the first audio output unit 230 of the first body 210 and the second audio output unit 240 of the second body 220. For example, it is not proper to apply the illustrated embodiment of the algorithm even to the case the first audio output unit 230 of the first body 210 is the tweeter speaker unit proper to output a higher-pitched sound even though the physical property of the second output unit 240 provided in the coupled second body 220 is the tweeter speaker unit. That is because the output properties of the woofer or tweeter speaker unit are relative.

Relatively, it may be determined based on a predesignated resistance set in each of the audio output units whether the physical properties of the audio output units are closer to the woofer speaker unit or the tweeter speaker unit. For example, when the resistance is preset to become higher as a value in the output enable frequency domain becomes higher, the audio conversion unit 211 can figure out which physical property of the audio output unit is coupled.

The resistance of the first body 210 including the first audio output unit 230 is defined as a reference resistance and stored (S701). Hence, a higher resistance may be preset as the second audio output unit has a physical property which is closer to the tweeter speaker unit and a smaller resistance may be preset as it has a physical property which is closer to the woofer speaker unit.

When the resistance of the coupled second body 220 is lower than that of the reference resistance (Yes in S703), the audio output unit 211 can recognize the second audio output unit 240 as a relative woofer speaker unit and convert the first audio signal into a high-pitched sound focused signal and the second audio signal into a low-pitched sound focused signal (S712).

When the resistance of the coupled second body 220 is higher than the reference resistance (No in S703), the audio conversion unit 211 can recognize the second audio output unit 240 as a relative tweeter speaker unit and convert the first audio signal into a low-pitched sound focused signal and the second audio signal into a high-pitched sound focused signal. Accordingly, the first audio signal can be converted to have a low-pitched sound tendency and the second audio signal to have a high-pitched sound focused (S713).

Before comparing the reference resistance with the resistance of the second body 220, it is determined whether a preset resistance is recognized and the audio conversion is performed. It is set as precondition to determine whether the second body 220 which is proper to output sound is coupled (S702). More specifically, it is premised that the first audio output unit 230 is the tweeter unit having a physical condition configured to generate a high output in a frequency domain of 1 kHz~2 kHz and the second audio output unit 240 is the tweeter speaker unit having a physical condition configured to generate a high output in a frequency domain of 2 kHz~5 kHz.

Accordingly, the resistance of the first audio output unit 230 may be preset as 50 Ohm and the resistance of the second audio output unit 240 as 70 Ohm. As the resistance of the second audio output unit 240 is larger than 50 Ohm, the audio conversion unit 211 can recognize the first audio output unit 230 as the woofer speaker unit and perform low-pitched-tone-focused conversion and it can recognize the second audio output unit 240 as the tweeter speaker unit and perform the high-pitched-tone-focused conversion.

The illustrated embodiments describes that the first audio signal is converted and transmitted according to the coupling of the second body 220. If necessary, even when the second body 220 is coupled to the first body 210, the normal-sound-focused default audio signal may be still output and only the second audio output unit 240 of the second body 220 may receive and output the specific-frequency-domain-focused second audio signal. Different from the illustrated embodiments, it matters which sound tendency the three of more speaker units have in case three or more speaker units are provided by the coupling of the second body 220.

Figure 8:
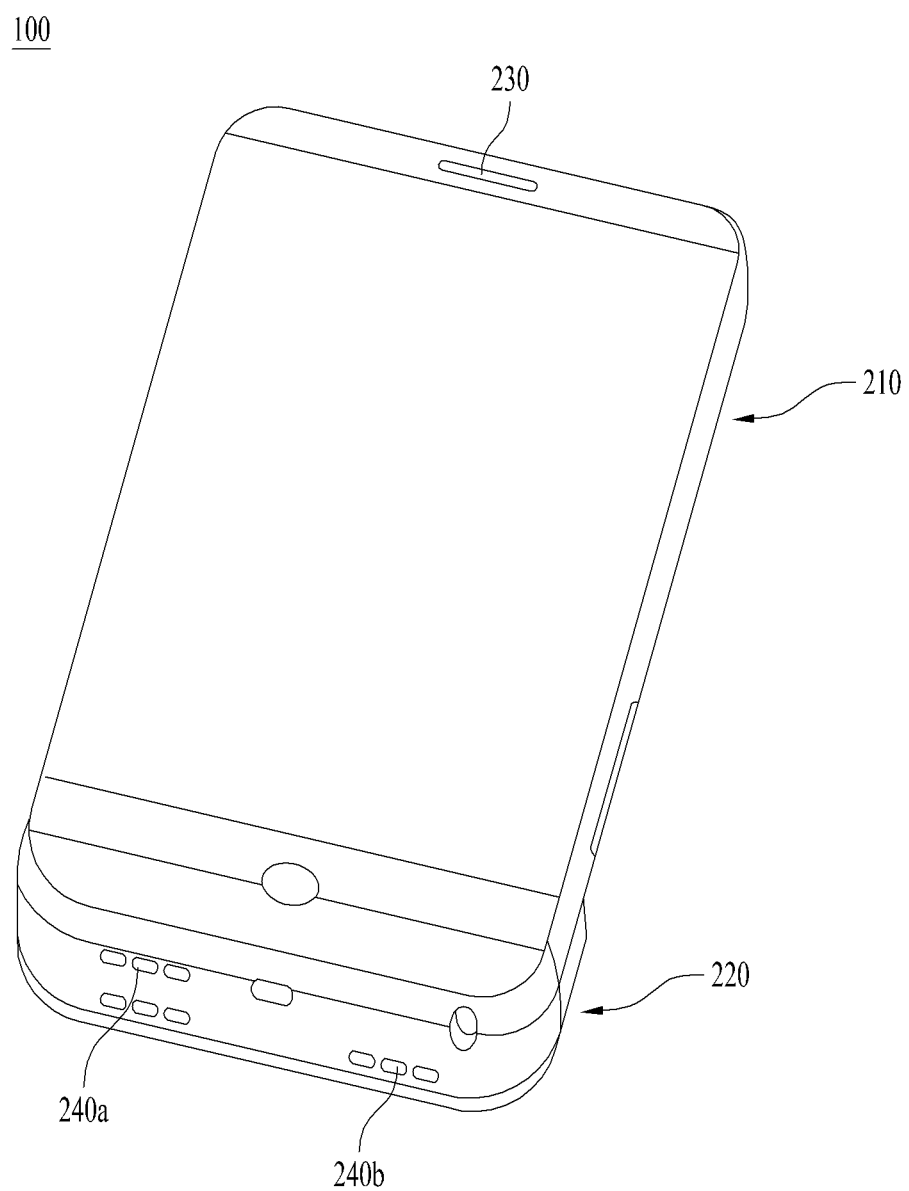
FIG. 8 is a diagram illustrating embodiments of the mobile terminal associated with the present disclosure.

Next, FIG. 8 is a diagram illustrating embodiments of the mobile terminal 100 associated with the present disclosure. The first body 210 may include one first audio output unit 230 and the second body 220 may include two audio output units 240a and 240b. Like the embodiment shown in FIG. 6, the audio conversion unit 211 transmits the first audio signal having the high-pitched-tone tendency corresponding to 3 graph curve of FIG. 2 to the first audio output unit 230, in case the second audio output units (240a and 240b) of the coupled second body 220 have the physical property of the woofer speaker unit. The audio conversion unit 211 transmits the second audio signal having the low-pitched-tone tendency corresponding to 1 graph curve of FIG. 2 to the second audio output units 240a and 240b.

If it was visa versa, the audio conversion unit 211 transmits the first audio signal having the low-pitched-tone tendency corresponding to 1 graph curve of FIG. 2 to the first audio output unit 230. The audio conversion unit 211 transmits the second audio signal having the high-pitched-tone tendency corresponding to 2 graph curve of FIG. 2 to the second audio output units 240a and 240b.

Figure 9:
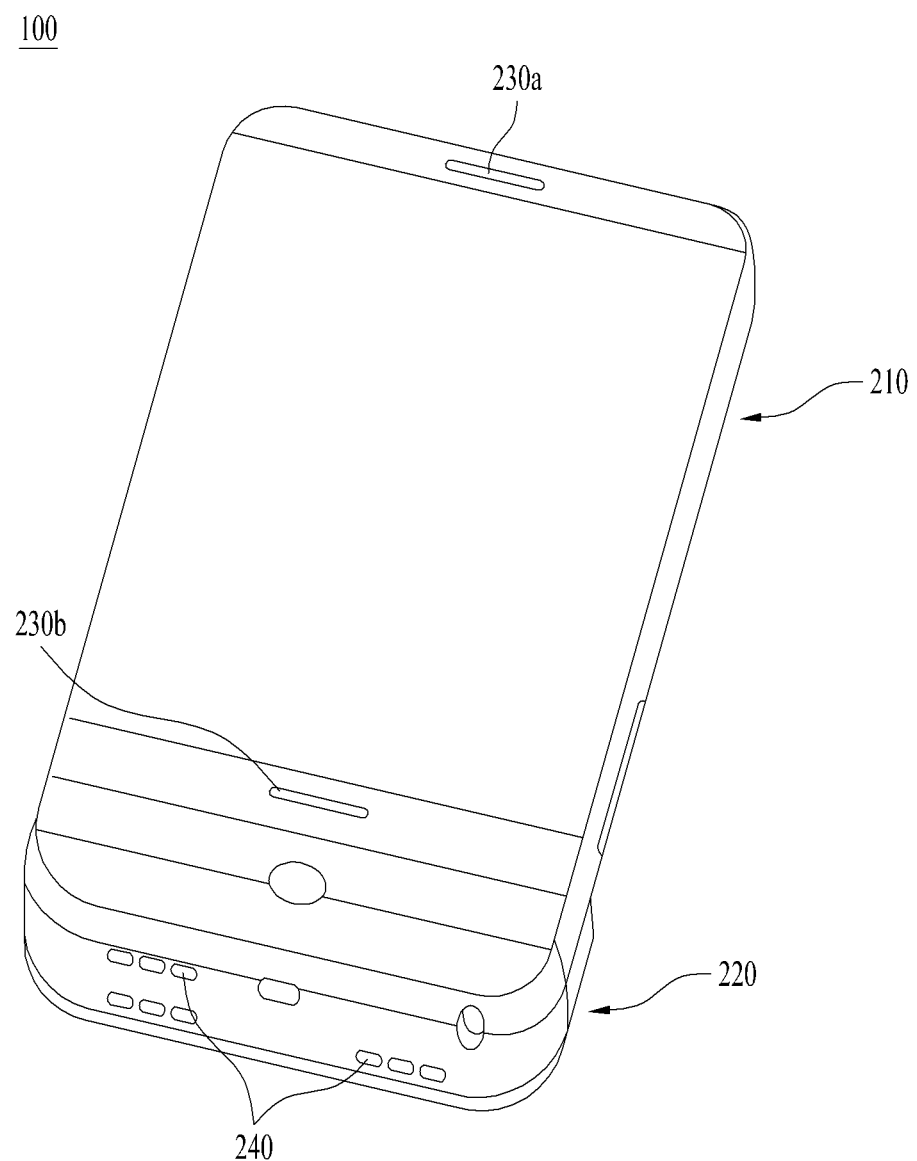
FIG. 9 is a diagram illustrating one embodiment of the mobile terminal associated with the present disclosure.

FIG. 9 is a diagram illustrating one embodiment of the mobile terminal 100 associated with the present disclosure. To the contrary to the embodiment of FIG. 8, the first body 210 may have two first audio output units 230a and 230b and the second body 220 may have one second audio output unit 240. Even in this instance, the audio conversion unit 211 may perform the conversion and transmission based on the same algorithm as the embodiment of FIG. 8.

Figure 10:
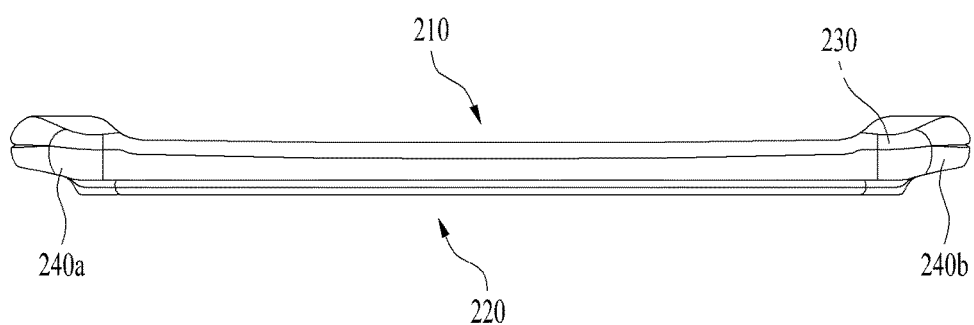
FIG. 10 is a diagram illustrating one embodiment of the mobile terminal associated with the present disclosure.

FIG. 10 is a diagram illustrating one embodiment of the mobile terminal 100 associated with the present disclosure. Different from the embodiment of FIGS. 7 through 9 showing that the second body 220 is coupled to a lateral surface of the first body 210, this embodiment shows that the second body 20 is coupled to a rear surface of the first body 210. Even in such coupling, each of the first and second bodies 210 and 220 may include one audio output unit. Alternatively, the first body 210 may include on first audio output unit 230 and the second body 220 may include two audio output units 240a and 240b as shown in the drawing.

It is shown that the two audio output units 240a and 240b are provided in the rear surface of the second body 220. As occasion demands, they may be provided in a front surface of the second body 220. As an alternative example, the first body 210 may include two first audio output units 230 and the second body may include one second output unit 240. The repeated description about the audio conversion unit 211 will be omitted.

Figure 11:
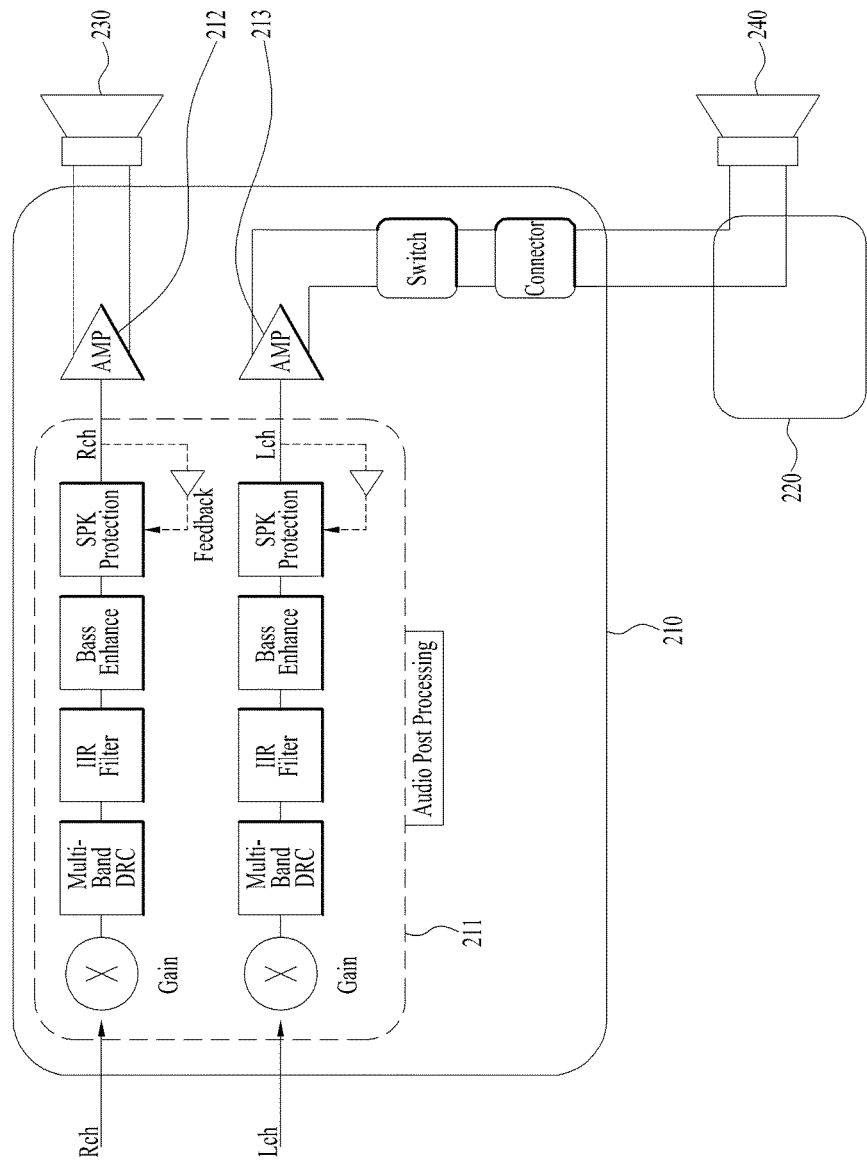
FIG. 11 is a schematic diagram illustrating flow of audio-signal of the mobile terminal associated with the present disclosure.

FIG. 11 is a schematic diagram illustrating flow of audio-signal of the mobile terminal 100 associated with the present disclosure. A sound source signal may include a left component channel and a right component channel. The sound source signal is processed for audio post processing performed by the audio conversion unit 211.

The audio conversion unit 211 can undergo a grain process for amplifying the sound source signal and strengthen a desired frequency range via Multi Band DRC. In other words, it can play an important part in converting the sound source signal into a specific-frequency-domain focused audio signal.

The IIR Filter is configured to remove the distortion of a specific frequency band which is generated by Band DRC. In addition, the Bass Enhance is configured to strengthen Bass, if necessary, and the Speaker Protection is configured to detect the amplitude, coil temperatures according to the impedance of the speaker and a state of the coil and control feedback of the output maximum of the audio signal.

The sound source signal finishes the audio post processing passes Amplifier and transmitted to the audio output unit. The first body 210 may include a first amplifier 212 connected to the first audio output unit 230, and a second amplifier 213 connected to the second audio output unit 240. When the first and second audio output units 230 and 240 have the same output tendency, in other words, are the normal speaker units or the tweeter speaker units, the audio post processing is implemented to set the left component channel and the right component channel to be equal to each other.

Figure 12:
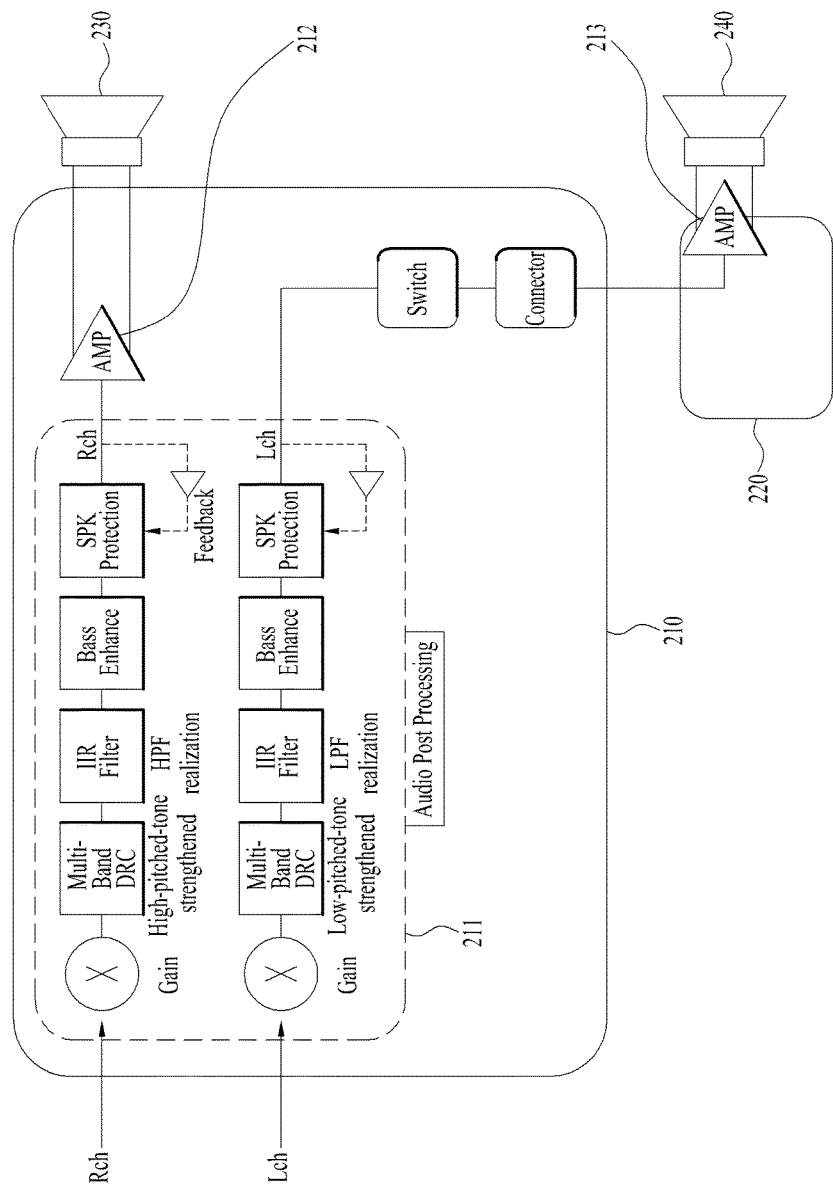
FIG. 12 is another schematic diagram illustrating flow of audio-signal of the mobile terminal associated with the present disclosure.

FIG. 12 is another schematic diagram illustrating flow of audio-signal of the mobile terminal 100 associated with the present disclosure. When one of the first and second audio output units 230 and 240 functions as the tweeter and the other one as the woofer, the audio post processing applied to the left component channel is different from that of the right component channel so as to perform corresponding audio conversion.

The sound source signal refined by the audio post processing is transmitted to the audio output unit via the amplifier. The first body 210 may include a first amplifier 212 connected to the first audio output unit 230, and a second amplifier 213 connected to the second audio output unit 240. Alternatively, the second body 220 may directly include the second amplifier 213.

As mentioned above, the controller of the first body 210 can recognize that the second body 220 is coupled based on a specific resistance of the coupled second body 220. If necessary, the second bodies 220 which are different types may have different resistances and perform required audio conversion based on which type of the second body 220 is coupled.

When it is recognized based on the resistance that the second body 220 is coupled, the audio conversion unit 211 can convert the sound source signal into the first audio signal, not into the default audio signal. At this time, the first audio signal may include a signal of which a high-pitched-tone frequency domain is focused.

Figure 13:
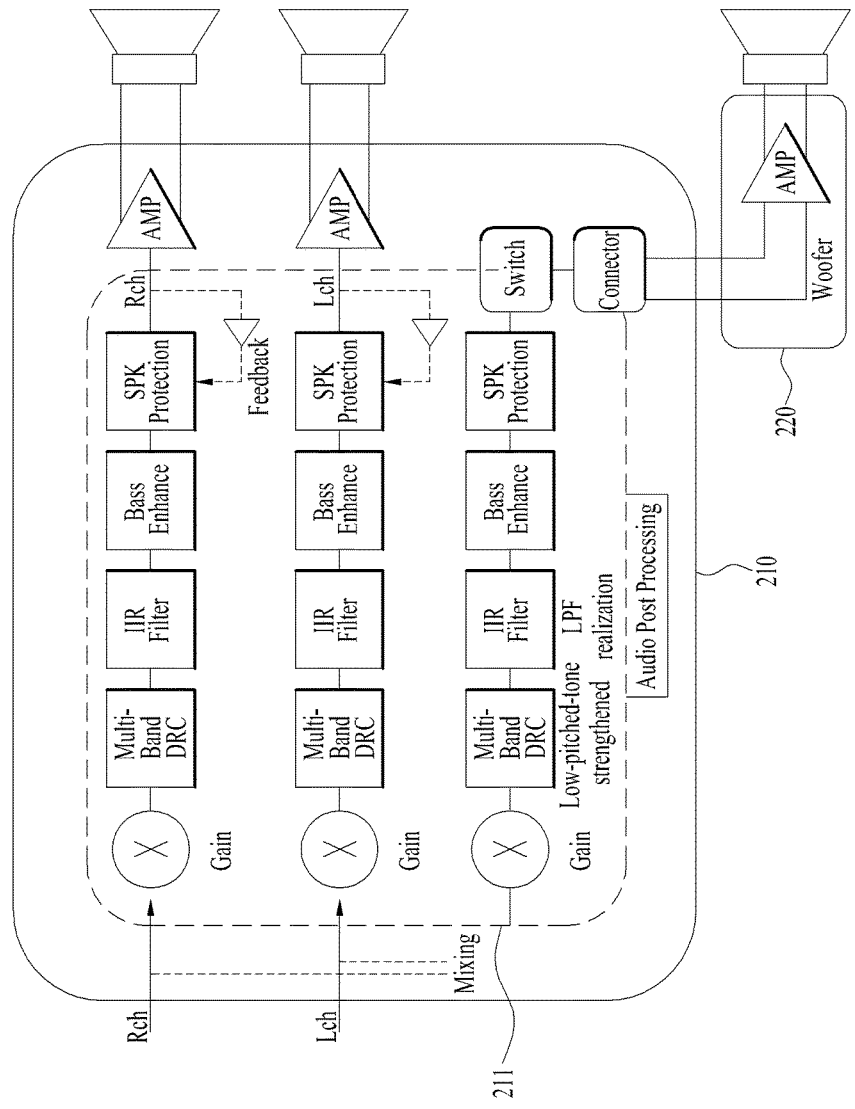
FIG. 13 is a further schematic diagram illustrating flow of audio-signal of the mobile terminal associated with the present disclosure.

FIG. 13 is a further schematic diagram illustrating flow of audio-signal of the mobile terminal 100 associated with the present disclosure. It is premised that the first body 210 includes two audio output units and the second body 220 includes one audio output unit. Comparing the embodiments of FIGS. 12 and 13 each other, the repeated description will be omitted.

A sound source signal of a right channel undergoes the audio post processing and is transmitted to one audio output of the first body 210. A sound source signal of a left channel undergoes the audio post processing and is transmitted to the other audio output unit of the first body 210. The sound source signal of the right channel and the sound source signal of the left channel may be mixed in appropriate proportions and undergo the audio processing, so that the mixed and refined signal may be transmitted to the audio output unit of the second body 220.

Especially, when the audio output unit of the second body 220 is the woofer unit, the mixed sound source signal may undergo Multi band DRC, IIR filter and Bass strengthening steps to strengthen a low-pitched-tone frequency band. In addition, when the second body 220 is coupled to the first body 210, the converted normal tendency audio signal may be transmitted to the two audio output units of the first body 210 or the converted high-pitched-tone focused audio signal may be transmitted to the first body 210.

Figure 14:
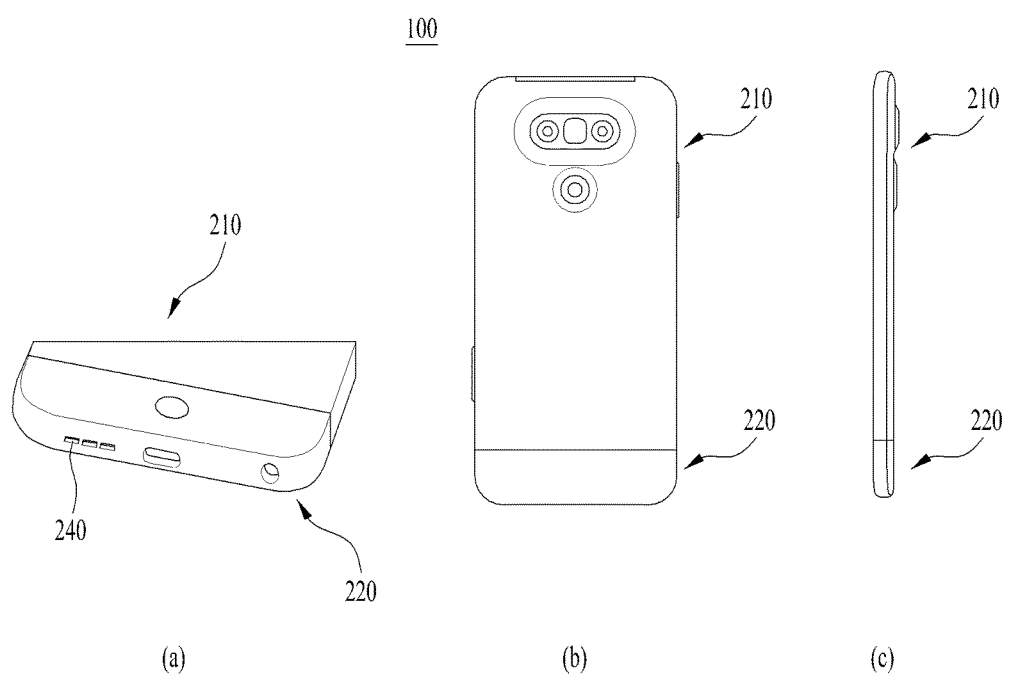
FIG. 14 is a diagram illustrating one embodiment of the mobile terminal associated with the present disclosure.

Next, FIG. 14 is a diagram illustrating one embodiment of the mobile terminal 100 associated with the present disclosure. The second body 220 including the second audio output unit 240 may be additionally coupled to the first body 210 including the first audio output unit 230. Alternatively, the second body 220 including the second audio output unit 240 may be coupled to the first body, replacing the first audio output 230.

For example, the second body 220 can slide with respect to a lower end of the terminal body. In this instance, the second audio output unit 240 may be the tweeter speaker unit and the tweeter speaker unit occupies not so much space and it may keep the same thickness as the first body 210 which is the terminal body.

Figure 15:
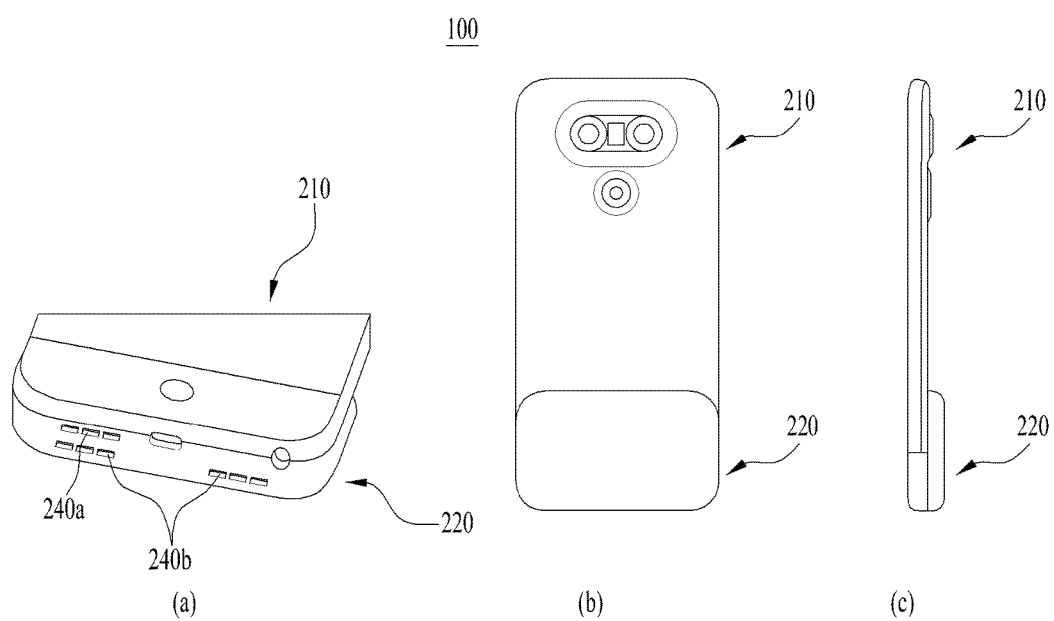
FIG. 15 is a diagram illustrating one embodiment of the mobile terminal associated with the present disclosure.

FIG. 15 is a diagram illustrating one embodiment of the mobile terminal 100 associated with the present disclosure. This embodiment of FIG. 15 is similar to the embodiment of FIG. 14, except that the second body 220 includes second audio output units 240*a* and 240*b* having two or more speaker units. Especially, when two speaker units are provided, one speaker unit may be a tweeter-type second audio output unit 240*a* and the other one may be a woofer-type second audio output unit 240*b*.

Figure 16:
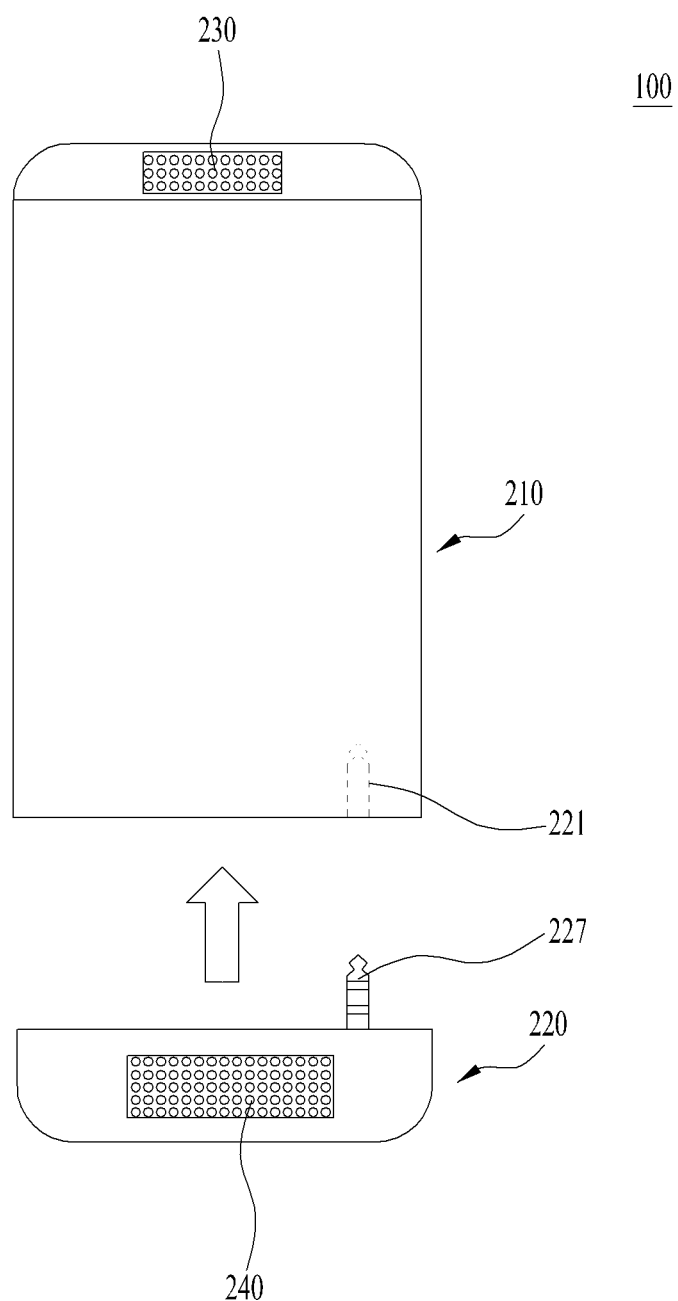
FIG. 16 is a diagram illustrating one embodiment of the mobile terminal associated with the present disclosure.

FIG. 16 is a diagram illustrating one embodiment of the mobile terminal 100 associated with the present disclosure. The first body 210 may include a 3.5 mm audio socket 221 for connection with a universal external speaker. A universal external speaker may be connected to the 3.5 mm audio socket 221 or the second body 220 may be connected thereto. In other words, the second body 220 may include a first connecting terminal 227 to electrically connecting the 3.5 mm audio socket 221 and the second audio output unit 240 to the second body 220. More specifically, the second body 220 may be additionally coupled to the first body 210, not replacing a predetermined portion of the first body 210.

Figure 17:
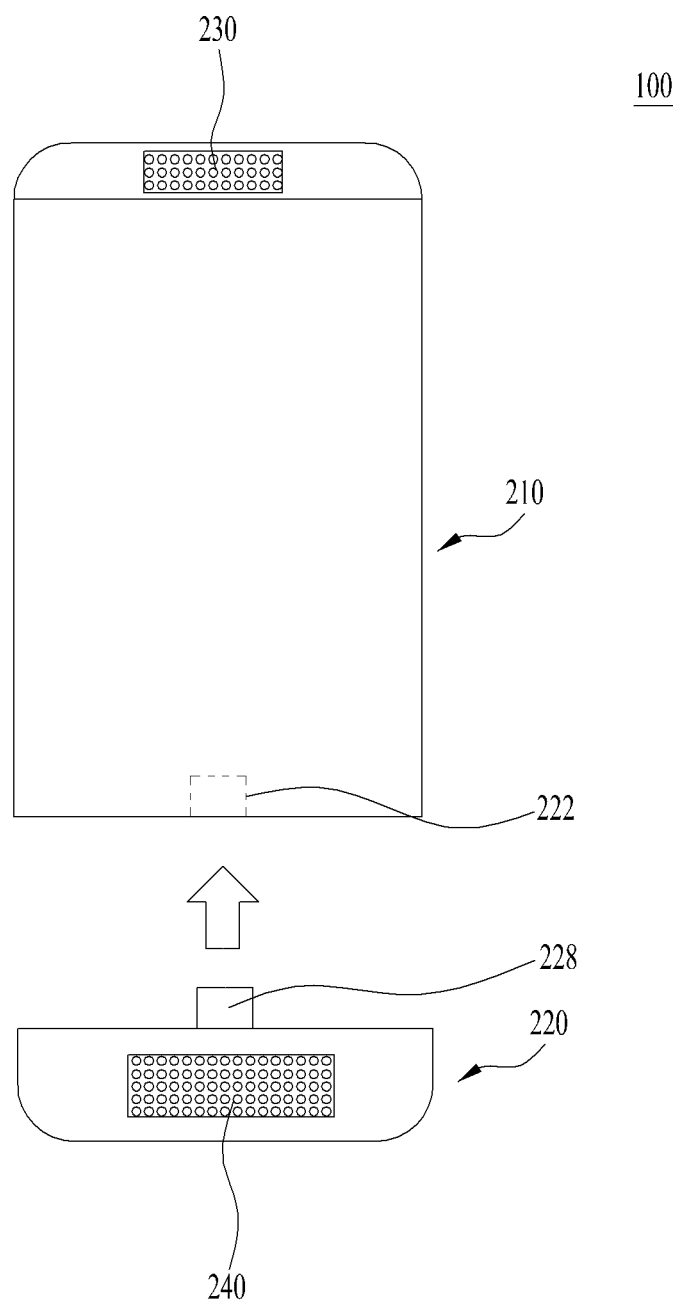
FIG. 17 is a diagram illustrating one embodiment of the mobile terminal associated with the present disclosure.

FIG. 17 is a diagram illustrating one embodiment of the mobile terminal 100 associated with the present disclosure. The second body 220 may be coupled to the first body 210 via a universal serial bus (USB) socket 222 which is provided in the first body 210. The second body 220 may include a second connecting terminal 228 for electrically connecting the USB socket 222 and the second audio output unit 240 with each other.

The surfaces of the first and second bodies 210 and 220 which face each other when the second body 220 is coupled to the first body 210 may be corresponding to each other, so as to stably keep the coupling without the separation of the second body 220 from the first body 210. The second audio output unit 240 provided in the second body 220 and the first audio output unit 230 of the first body 210 may be arranged toward the same direction. In case the first and second audio output units 230 and 240 are arranged in the same direction, the high-pitched sound and the low-pitched sound are separated from each other without giving any sense of difference to a listener.

The second body 220 may be coupled to a predetermined portion of the first body 210. The first audio output unit 230 of the first body 210 and the second audio output unit 240 of the second body 220 may be provided in upper and lower end portions of the mobile terminal 100, respectively, spaced apart a preset distance from each other. When the first audio output unit 230 and the second audio output unit 240 are located distant from each other, the low-pitched or bass sound and the high-pitched sound will not interfere in each other and be output in a separated state.

Figure 18:
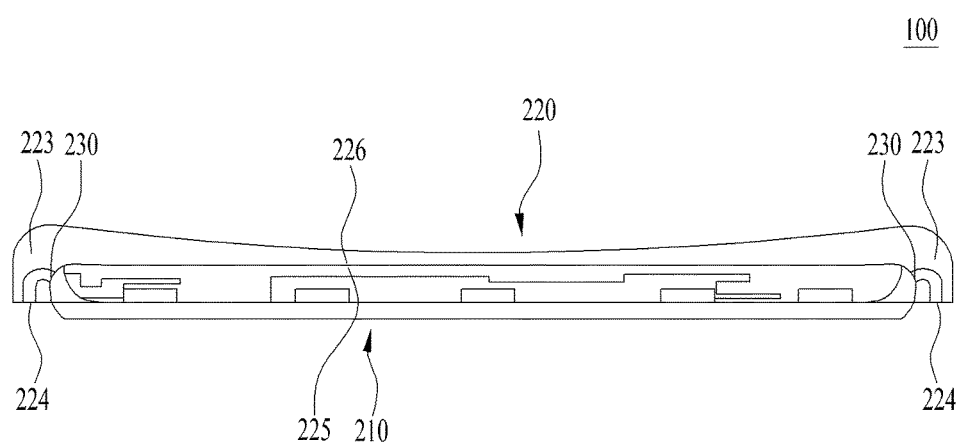
FIG. 18 is a diagram illustrating one embodiment of the mobile terminal associated with the present disclosure.

FIG. 18 is a diagram illustrating one embodiment of the mobile terminal 100 associated with the present disclosure. The second body 220 may be coupled so surround lateral portions or more of the first body 210. For example, the second body 220 may surround upper and lower lateral surface of the first body 210 and a rear surface of the first body simultaneously.

In other words, the second body 220 may include a seating portion for seating the first body 210 thereon. One portion of the first body 210 seated on the second body 220 may correspond to the seating portion of the second body 220, so that the second body 220 may be fittedly coupled to the first body 210.

Further, the second body 220 may be coupled to the first body 210 via the 3.5 mm audio socket 221 mentioned above or the USB socket 222. When the socket or port is formed in the lateral surface of the first body 210, the second body 220 may include a socket or terminal provided in a corresponding position to be connected to the socket or port.

In this instance, the first body 210 and the second body 220 may be seated in a back and forth direction of the mobile terminal 100. In addition, the connection of the terminal may be insertedly performed in a lateral direction. To realize such the coupling, the second body 220 includes an elastic body and the terminal is connected to the second body. After that, the second body 220 is deformed to be coupled to the first body 210.

As an alternative example, the second body 220 includes two separated members to be slidingly coupled to each other. In other words, the second body 220 may slide to be separated from and coupled to each other in both lateral directions with respect to the connection of the terminal.

Figure 19:
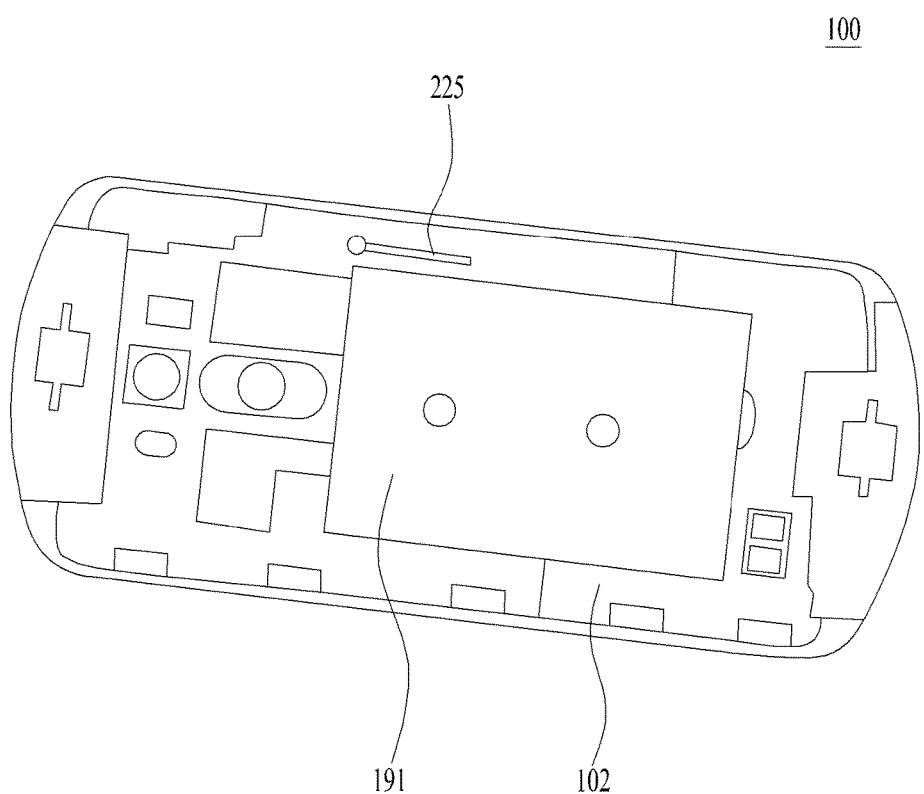
FIG. 19 is a diagram illustrating one embodiment of the mobile terminal associated with the present disclosure.

FIG. 19 is a diagram illustrating one embodiment of the mobile terminal 100 associated with the present disclosure. The second body 220 surrounding both lateral surfaces of the first body 210 may be coupled while replacing the rear cover 103, not coupled via the 3.5 mm audio socket 221 or the USB socket 222.

More specifically, the first body 210 may be provided to have a rear surface in which the rear cover can be detachably coupled. Further, a predetermined portion may be aligned to the rear cover 103 for an antenna or wireless charging. A first terminal 225 may be provided in the rear surface of the first body 210 to connect that portion with the PCB of the first body 210.

Referring to FIG. 18 again, when the second body 220 is coupled to the first body as the rear cover 103, a second terminal 226 may be provided in the second body 220 configured to contact with the first terminal 225 of the first body 210 to electrically connect the first body 210 and the second body 220 with each other. The first terminal 225 and the second terminal 226 face each other to contact with each other when the second body 220 is coupled to the first body 210.

The second body 220 may include an expanded portion 223 projected from one side and the other side of lateral surface of the first body 210. The expanded portion 223 may the required portion because the second body 220 has to hold the lateral surfaces of the first body 210, when the second body 220 is coupled to the first body 210.

The second audio output unit 240 may be provided in the expanded portion 223 of the second body 220. When the first audio output unit 230 is provided in the front surface of the first body 210, the second audio output unit 240 may be provided in one side of a front surface of the expanded portion 223 of the second body 220 which is arranged in the same direction.

As one example, when the first audio output unit 230 located in the lateral surface of the first body 210 is covered by the second body 220, it is unlikely to transmit the output of the first audio output unit 230 properly in such the structure. To prevent the disadvantage, the second body 220 may be formed in the corresponding position to the first audio output unit 230 and include a sound hole 224 for forming an open portion in the front surface of the expanded portion 223.

The sound hole 224 may allow the sound output from the first audio output unit to travel along a front surface and output sound in the same direction as the second audio output unit 240. When the second body 220 includes two audio output units, the two audio output units may be provided in one side and the other side of the front surface of the expanded portion 223 of the second body 220, respectively.

If necessary, the second body 220 may further include an auxiliary battery. As the second audio output unit 240 consumes electricity together with the first audio unit 240. The auxiliary battery is employed to compensate the total power consumption. In addition, at least predetermined portion of the second body 220 may include graphite. Graphite has a high heat conductivity and facilitates the emission of the heat generated by the addition of the second audio output unit 240.

Figure 20:
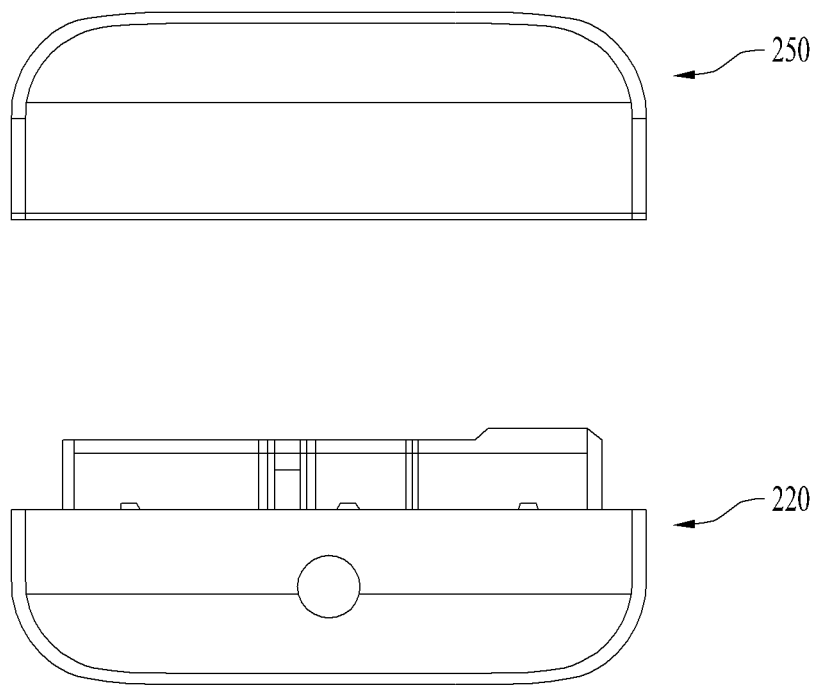
FIG. 20 is a diagram illustrating one embodiment of a second body associated with the present disclosure.

FIG. 20 is a diagram illustrating one embodiment of the second body 220 associated with the present disclosure. The second body 220 may be coupled to a third body 250 to make one module. In other words, the second body 220 may be detachably coupled to the first body 210 and detachably coupled to the third body 250. The second body 220 coupled to the third body 250, not the first body 210, can function as independent Digital to Analog Conversion (DAC), which will be described in detail.

Figure 21:
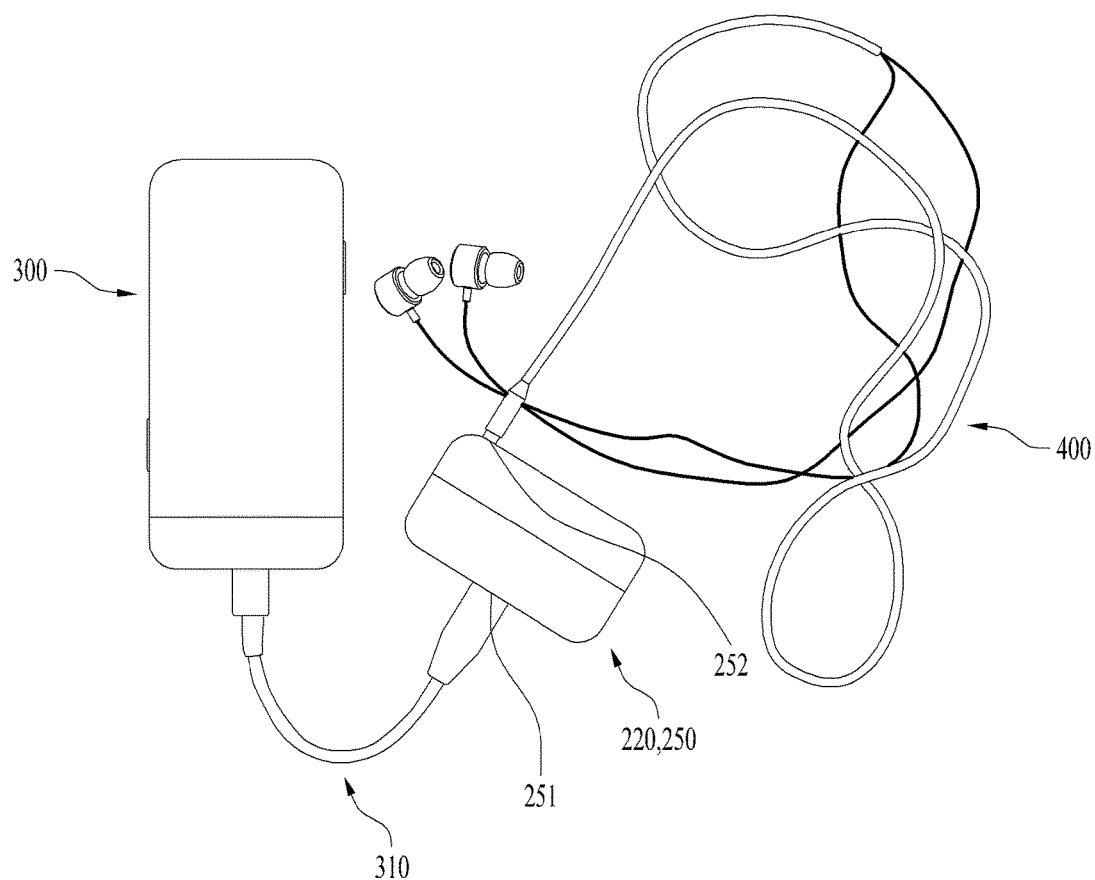
FIG. 21 is a diagram illustrating another embodiment of the second body associated with the present disclosure.

FIG. 21 is a diagram illustrating another embodiment of the second body 220 associated with the present disclosure. The third body 250 may include a wired port 251. On end of the wired port 251 may be electrically connected with the second audio output unit 240 and the other end may be connected with an external device 300 via a wire cable 310.

The external device 300 may be connected to the third body 250 and the second body 220 via the wire cable 310 and output sound by using the second audio output unit 240 of the second body 220. Alternatively, a receiver 400 may be connected to an earphone jack 252 provided in the second body 220 to output sound via the receiver 400.

Figure 22:
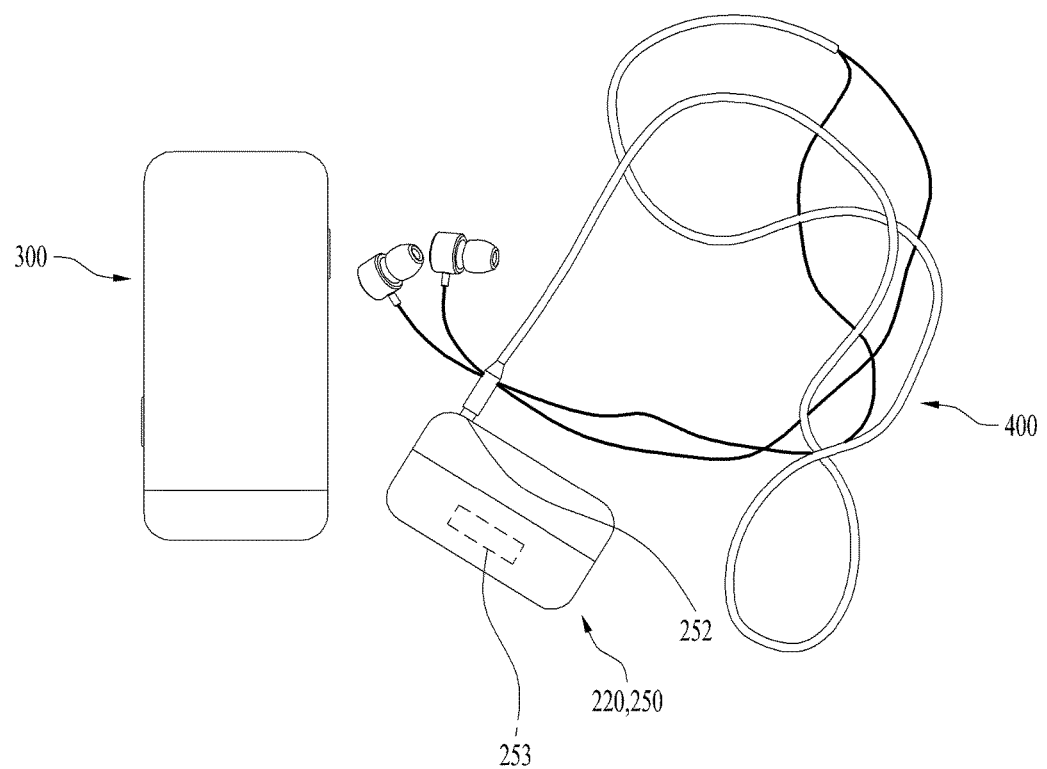
FIG. 22 is a diagram illustrating a still further embodiment of the second body associated with the present disclosure.

FIG. 22 is a diagram illustrating a still further embodiment of the second body 220 associated with the present disclosure. Different from the embodiment of FIG. 21, the embodiment of FIG. 22 shows that the external device 300 can transceive an electrical signal with the second audio output unit 240 of the second body 220 via wireless communication. The third body 250 may include a wireless communication module 253 configured to transceiver an electrical signal between the second audio output unit 240 and the external device 300.

It will be appreciated by those skilled in the art that the present invention can be specified into other form(s) without departing from the spirit or scope of the inventions. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a first body;
a first audio output unit provided in the first body and configured to output sound;
an audio conversion unit provided in the first body and configured to convert a sound source signal into an audio signal;
a second body detachably coupled to the first body; and
a second audio output unit provided in the second body and configured to output sound,
wherein the audio conversion unit converts the sound source signal into a default audio signal and transmits the converted signal to the first audio output unit, when the audio conversion unit recognizes the second body is detached from the first body,
wherein the audio conversion unit converts the sound source signal into a first audio signal and a second audio signal and transmits the converted first audio signal to the first audio output unit and the converted second audio signal to the second audio output unit, when the audio conversion unit recognizes the second body is coupled to the first body, and
wherein a frequency character of the default audio signal is normal-sound-focused, and a frequency character of the first audio signal and the second audio signal is specific-frequency-domain-focused.

2. The mobile terminal of claim 1, wherein the audio conversion unit is further configured to recognize that the second body is coupled to the first body, when a resistance of the coupled second body corresponds to a reference resistance.

3. The mobile terminal of claim 1, wherein the audio conversion unit is further configured to convert the second audio signal to be a low-pitched-tone focused signal and the first audio signal to be a high-pitched-tone focused signal, when the second audio output unit is a woofer speaker unit.

4. The mobile terminal of claim 1, wherein the audio conversion unit is further configured to convert the second audio signal to be a high-pitched-tone focused signal and the first audio signal to be a low-pitched-tone focused signal, when the second audio output unit is a tweeter speaker unit.

5. The mobile terminal of claim 1, wherein the audio conversion unit is further configured to differentiate the focused frequency domains of the first and second audio signals based on a resistance of the coupled second body.

6. The mobile terminal of claim 1, further comprising:
a 3.5 mm audio socket provided in a first portion of the first body; and
a first connection terminal provided in the second body and configured to electrically connect the 3.5 mm audio socket and the second audio output unit with each other.

7. The mobile terminal of claim 1, further comprising:
a universal serial bus (USB) socket provided in a second portion of the first body; and
a second connection terminal provided in the second body and connected with the USB socket.

8. The mobile terminal of claim 1, further comprising:
a first amplifier provided in the first audio output unit; and
a second amplifier provided in the second audio output unit.

9. The mobile terminal of claim 1, wherein the second body comprises a rear cover detachably coupled to a rear surface of the first body, and
wherein the mobile terminal further comprises:
a first terminal provided in the rear surface of the first body and configured to contact with a wireless charging terminal of the rear cover; and
a second terminal provided in a front surface of the second body and configured to contact with the first terminal, when the rear cover is coupled to the first body.

10. The mobile terminal of claim 9, wherein the second body comprises:
   an expanded portion projected from one side and the other side of a lateral surface of the first body, and
   wherein the second audio output unit is provided in one side of a front surface of the expanded portion.

11. The mobile terminal of claim 10, wherein the first audio output unit is provided in the other side of the lateral surface of the first body, and
   wherein the second body comprises a sound hole formed in a corresponding portion to the first audio output unit and configured to define an opening in the other side of the front surface of the expanded portion.

12. The mobile terminal of claim 10, wherein the second body comprises:
   an expanded portion projected from one side and the other side of a lateral surface of the first body, and
   wherein the second audio output units are provided in one side and the other side of a front surface of the expanded portion, respectively.

13. The mobile terminal of claim 1, further comprising:
   an auxiliary battery provided in the second body.

14. The mobile terminal of claim 1, wherein at least predetermined one portion of the second body comprises graphite.

15. The mobile terminal of claim 1, wherein at least predetermined one portion of the second body comprises an elastic material.

16. The mobile terminal of claim 1, wherein the second body is detachably sliding with respect to the first body.

17. The mobile terminal of claim 1, further comprising:
   a third body detachably coupled to the second body; and
   a wire port provided in the third body and electrically connected with the second audio output unit of the second body.

18. The mobile terminal of claim 1, further comprising:
   a third body detachably coupled to the second body; and
   a wireless communication module provided in the third body and electrically connected with the second audio output unit of the second body to facilitate transceiving of an electrical signal between the second audio output unit and an external device.

* * * * *